Jan. 2, 1934. N. MINORSKY Re. 19,038

INDUCTION COMPASS

Original Filed July 8, 1925 4 Sheets-Sheet 1

INVENTOR.
Nicolai Minorsky.
BY
Stephen Berstrick.
ATTORNEY.

INDUCTION COMPASS
Original Filed July 8, 1925 4 Sheets-Sheet 2
Fig. 3
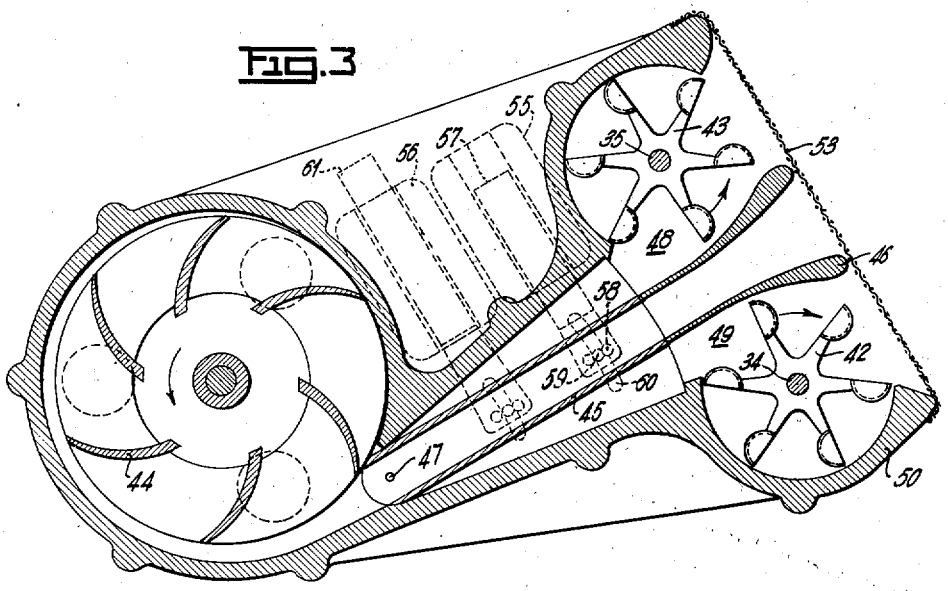
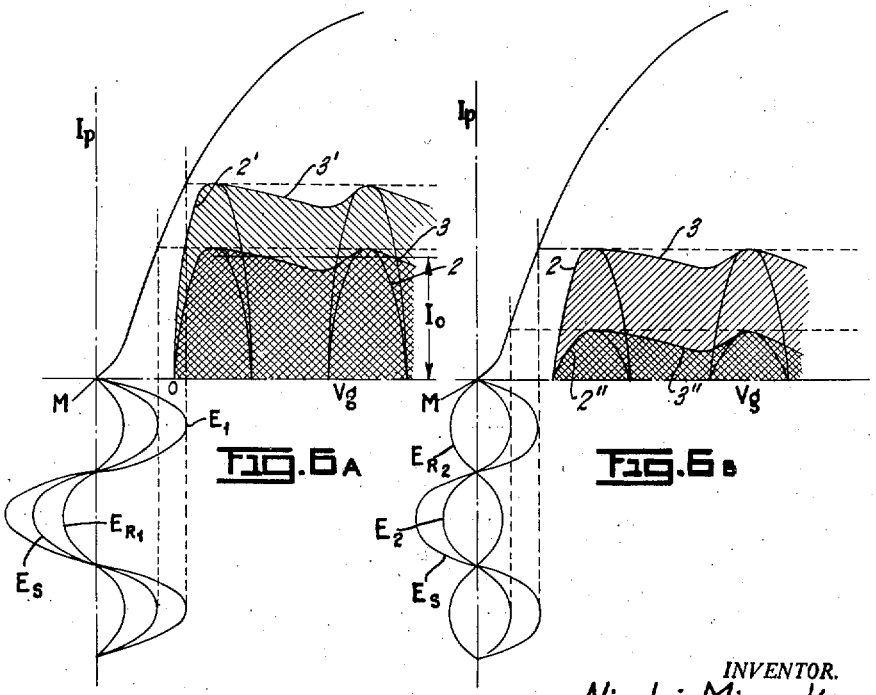
Fig. 6A
Fig. 6B
INVENTOR.
Nicolai Minorsky.
BY
Stephen Berstvik.
ATTORNEY

INDUCTION COMPASS

Original Filed July 8, 1925 4 Sheets-Sheet 3

INVENTOR.
Nicolai Minorsky.
BY Stephen Berstvik.
ATTORNEY

Jan. 2, 1934. N. MINORSKY Re. 19,038
INDUCTION COMPASS
Original Filed July 8, 1925 4 Sheets-Sheet 4
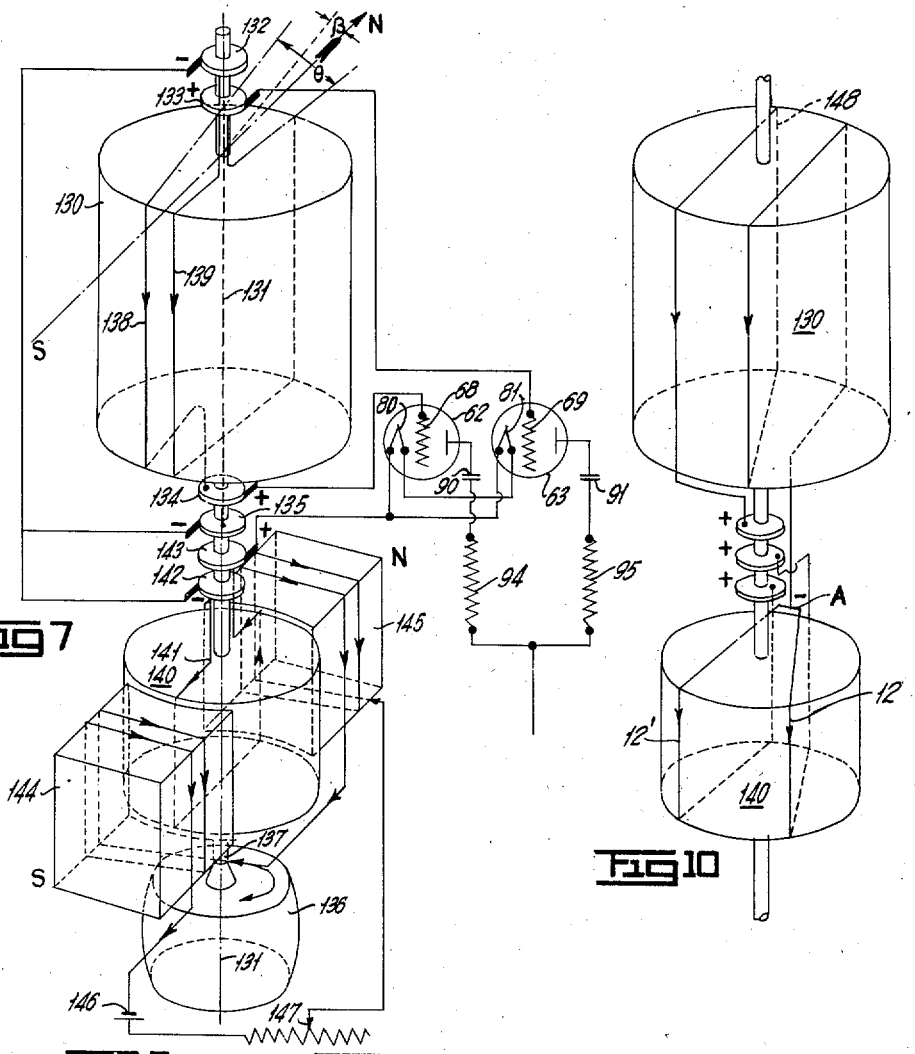
Fig 7
Fig 10
Fig 8
Fig 9
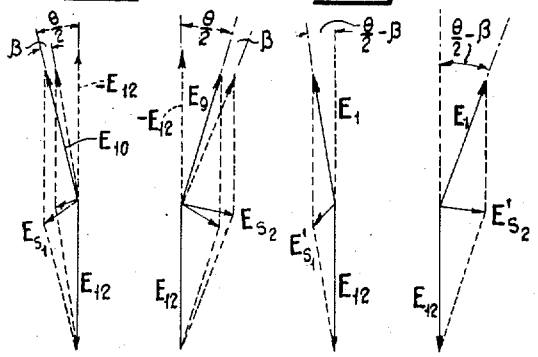
INVENTOR.
Nicolai Minorsky.
BY Stephen Berstrik.
ATTORNEY Reissued Jan. 2, 1934 Re. 19,038

UNITED STATES PATENT OFFICE 19,038

INDUCTION COMPASS

Nicolai Minorsky, Swarthmore, Pa., assignor to Bendix Aviation Corporation, South Bend, Ind., a corporation of Delaware Original No. 1,840,911, dated January 12, 1932, Serial No. 42,270, July 8, 1925. Application for reissue January 25, 1933. Serial No. 653,527

33 Claims. (Cl. 33—204)

This invention relates to a device capable of use for indicating direction or for maintaining the position of a body in a definite direction. More particularly the invention relates to a compass operating to orient itself in line with the horizontal component of the earth's magnetic field, and utilizing such field to generate or induce electromotive forces, which in turn cause the initiation of mechanical forces operating to keep the direction of the compass uniform.

Such induction compasses have been proposed in the past, but have not given such satisfaction as to make them desirable in the usual installation, as on shipboard or on aircraft. It is one of the objects of my invention to provide an improved induction compass capable of satisfactory and reliable used.

The principle upon which induction compasses are constructed is quite simple, and involves the rotation of an armature in the earth's magnetic field to generate the electromotive force that serves to control the compass. In the past, it has been found impossible to arrange and construct the armature in such a manner as to be substantially free from the deleterious effect of the vertical component of the earth's magnetism. This vertical component if allowed to influence the rotating armature, disturbs its operation as a true compass. By practicing my invention, it is possible to annul the effect of this vertical component.

An induction compass constructed in accordance with my invention has advantage over the usual magnetic compass. Since such magnetic compasses operate in a fluid, there is a "dragging error" which is entirely obviated by my device. Furthermore, such magnetic compasses, operating, as they do, with a minute torque, have only a limited field of utility, since they cannot be used as repeater compasses.

In prior types of induction compasses, it was necessary to supply a commutator for the armature influenced by the earth's field, upon which commutator a pair of brushes rested. In my invention such a commutator is obviated, and there is thus no bad effect due to roughness of the commutator or the like, upon the generated electromotive force.

My invention has other advantages and objects that will become apparent as the description proceeds. The embodiments illustrated are but a few of many forms that my invention can take; the claims appended hereto serving to define the extent of the invention, and also to point out more particularly the features of novelty upon which the invention rests.

Referring to the drawings:

Fig. 3 is a sectional view along plane 3—3 of Fig. 2;

Figs. 5A, 5B, 6A and 6B are explanatory diagrams for use in exposing the principle of operation of the system shown in Fig. 4;

Fig. 7 is a diagrammatic view of a portion of the modified form of my invention;

Figs. 8 and 9 are vector diagrams explanatory of the system of Fig. 7; and

Fig. 10 is a diagram of a still further modification.

Figure 1:
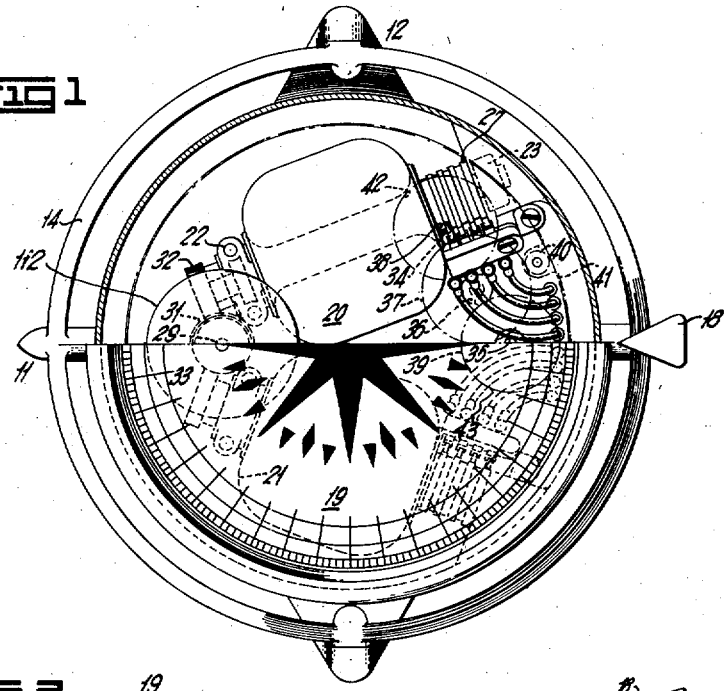
Figure 1 is a top plan view of an induction compass constructed in accordance with my invention, a part of the compass card being cut away.

In order to maintain the induction compass mechanism in proper fixed horizontal relation even when mounted on shipboard, the conventional gimbals 11 and 12 are provided, and are shown as a pair of concentric rings 13 and 14, the inner ring 13 being pivoted to the outer ring 14, and the outer ring 14 being pivoted on the stationary pivots fixed to the ship, and on an axis substantially perpendicular to the axis of the inner ring pivots.

Mounted on the inner ring 13 is a support 15, showing in this instance as a vertical tubular device and as having a bottom 16. This support 15 is mounted for rotation about a vertical axis on ring 13, as by the aid of the ball step bearing 17. The arrangement is such that, due to the operation of the mechanism to be described, the angular position of this rotatable support 15 remains fixed in azimuth relative to the isogonal lines on the surface of the earth, irrespective of the movement of the body that carries the gimbals 11, 12. Thus this element 15 can be used for repeating; that is, to operate by electric circuits a plurality of distant compass cards. In the present instance for the sake of simplicity I show a conventional compass card 19 mounted on top of the support 15 and arranged to cooperate with an index 18 fastened to the body on which the compass is located.

Within the support 15 is located the induction element of the device, which is electro-magnetically influenced by the earth's field, and which sets up the forces that maintain the direction of the support 15 fixed along a magnetic meridian. It is one of the important features of my invention that this element is not influenced by the vertical component of the earth's field. For this purpose, the element comprises two rapidly rotating armature drums 20 and 21, mounted for rotation on horizontal axes, provided by the bearings 22, 23.

Figure 4:
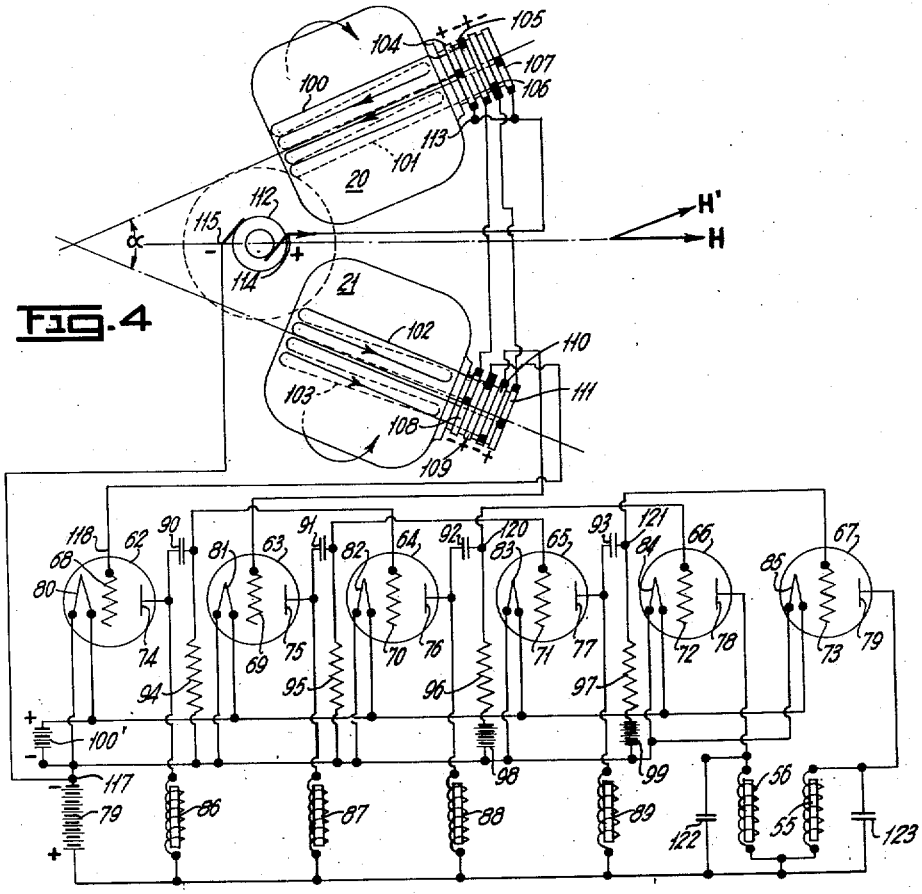
Fig. 4 is a wiring diagram of an induction compass installation embodying my invention.

In the embodiment shown in Figs. 1, 2, 3, and 4, the axes of these two armature drums are displaced by a small angle from each other, as illustrated in the diagram, Fig. 4. The armatures 20, 21 each have two separate windings of an equal number of turns. These windings are single phase windings shown as simple coils 100, 101, 102, 103 wound on the armature drums 20, 21. The drums 20, 21 can be made either of a non-magnetic material, or may contain certain substances of high magnetic permeability, such as permalloy, in order to increase the flux linkages of the terrestrial magnetism with the coils 100, 101, 102, 103 and thus to increase the induced E. M. F. The planes of coils 100 and 101 are parallel, as well as those of coils 102, 103 so that the E. M. F.'s induced in each pair by their rotation in the terrestrial field are strictly in phase with each other. Each of the coils, 100 and 101, on armature 20, has two terminals consisting of four leads being brought out to four slip rings 104 and 105, and 106 and 107, respectively, on which bear brushes connecting the circuit of the coil in question to the external circuits to be described later. The ends of the other coils 102 and 103 are connected in a similar manner to the slip rings 108 and 109, and 110 and 111, respectively. The two armatures 20, 21 are rotated from a source of driving power such as electric motor 28, Fig. 2, by means of a positive drive, obtained by any suitable gears such as the gears 31 and 32 shown on Figs. 1 and 2. It becomes thus possible so to interconnect the two armatures 20, 21 mechanically that the E. M. F.'s induced in each by the flux of the horizontal component of the earth's magnetic field are in phase with each other. This can be obtained by a suitable meshing of the teeth between the driving and the driven pinions, which relation naturally will persist indefinitely in view of the fact that the drive is positive.

It follows therefrom that the four E. M. F.'s E100, E101, E102, E103 induced in the four coils 100, 101, 102, 103 will be strictly in phase with each other. The connections between the circuits of the coils are established as follows: Assume the conditions as presented in Fig. 4 and the armatures 20 and 21 rotated in opposite directions as indicated by the arrows. The direction of the horizontal component of the terrestrial magnetism is represented by the arrow "H", the vertical component being perpendicular to the plane of the paper. Under these conditions the E. M. F.'s induced in the coils 100, 101, 102, and 103 can be assumed to have instantaneous values and directions represented by the arrows on these windings. To these correspond certain instantaneous polarities of the slip rings as indicated by plus and minus signs. The connections between the circuits of the coils are so established that, for instance, the coils 100 and 102 are in opposition to each other; and the coils 101 and 103 are also opposed.

The connections will be further detailed in connection with the description of the amplifier system.

It is evident that, due to the opposition of the coils in this manner, the vertical component of the earth's field has no effect upon the combined circuits for whatever E. M. F. for example be induced thereby in coil 100, is neutralized constantly by the E. M. F. induced in the opposed coil 102. This neutralization is entirely independent of the angular position of the axes with respect to component H.

This is not the case however, of the E. M. F.'s that are due to the horizontal component H except when the position of support 15 is such that the angle $a$ (Fig. 4), is bisected by the direction of H. Under such circumstances, the E. M. F.'s are all equal, and cancel each other. As soon as there is a deviation of the support 15, due for example to a shift in the heading of the ship or airplane, the E. M. F.'s due to the horizontal component no longer cancel. Thus, assuming that the support 15 has moved in a clockwise direction so that the horizontal component relative to it is represented by H', then alternating E. M. F.'s of larger amplitude are induced in coils 102 and 103, while alternating E. M. F.'s of smaller magnitude are induced in coils 100 and 101. The result is a departure from conditions of balance, which bring into play mechanical forces to correct the position of support 15 and return it to its desired symmetrical position.

It would be possible directly to utilize these departures from exact neutralization, and in fact to rectify the resultant E. M. F.'s but I prefer to provide another E. M. F. which is uniform under all conditions and upon which these resultant E. M. F.'s are superposed. The controlling E. M. F.'s are thus of considerable magnitude at all times. The reference E. M. F. upon which the resultants are superposed, can conveniently be provided by the aid of an armature 112 having a vertical axis and driven by the motors 28. This armature generates an E. M. F. due to its rotation in the earth's field, the amplitude of which E. M. F. is not influenced by any deviations of support 15 from its symmetrical position. It has brushes 114, 115 whereby the generated reference E. M. F. can be made available in the control system. For this purpose, coils 112, 100 and 102 are connected in series in such manner that the E. M. F. of coil 112 is opposed to that of coil 100, but assists that of coil 102. This series circuit can be traced as follows: from filament 80 of an electronic amplifier 62, a point 117 to a brush 115 of coil 112 which is momentarily assigned a negative value; positive brush 114, point 113, momentarily positive terminal of coil 100, through coil 100, momentarily negative terminal of coil 100, negative terminal of coil 102, through coil 102, momentarily positive terminal of coil 102, connection 118, to a grid or control element 68 in the electronic emission amplifier system. The polarities assigned are merely for the purpose of disclosing the relative phases.

Figure 5A:
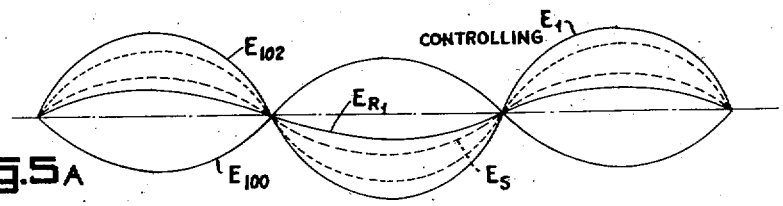

While there is no deviation of support 15, the resultant E. M. F. in this series circuit reduces to that due to coil 112, and is represented by the wave $E_s$ (Fig. 5A). But when the deviation as heretofore mentioned, occurs, then E. M. F. $E_{102}$ generated in coil 102 is greater than E. M. F. $E_{100}$ generated in coil 100. This is due to the fact that the relative direction of the axis of coil 102 to that of component H' is now more nearly perpendicular, while the relative direction of the axis of coil 100 is more nearly parallel to that of component H'. Therefore, the E. M. F. resulting in the series circuit just traced, and including coils 112, 100, and 102, is now represented by the wave $E_1$ of Fig. 5A. This wave is equal to the sum of $E_s$ and of the resultant between $E_{102}$ and $E_{100}$, said resultant being represented by $E_{R1}$. It is seen that $E_{R1}$ is in the same phase as $E_{102}$ because $E_{102}$ is larger than $E_{100}$.

The net result of the deviation, then is to impress between grid 68 and its filament 80, an alternating E. M. F. of larger amplitude than when there is no deviation of support 15. The effects of this variation an the amplifier system will be discussed hereinafter.

Another control element 69 in an electronic emission tube 63 is affected in an analogous manner, but in such a way that the E. M. F. existing between its filament 81 and the element 69 is reduced whenever the deviation occurs in the direction specified hereinbefore. The control circuit from filament 81 to grid 69 can be traced as follows: filament 81, point 117, negative brush 115 of armature 112, positive brush 114 of armature 112, negative terminal of coil 101, through coil 101, positive terminal of coil 101, positive terminal of coil 103, through coil 103, negative terminal of coil 103, to grid 69.

Figure 5B:
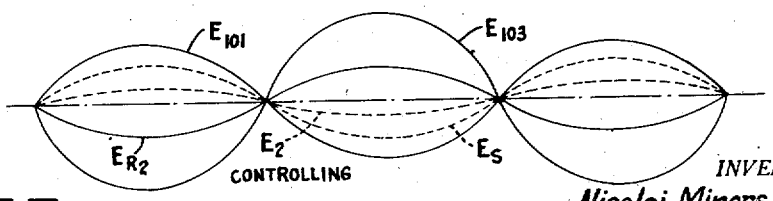

While there is no deviation of support 15, the resultant E. M. F. of this series circuit also reduces to that due to coil 112, and is represented by a wave $E_s$ of Fig. 5B. But when the deviation occurs, then E. M. F. $E_{103}$ generated in coil 103 is greater than E. M. F. $E_{101}$ generated in coil 101. The resultant E. M. F. in the series circuit just traced, and including coils 112, 101, and 103, is now represented by the wave $E_2$ of Fig. 5B. This wave is equal to the algebraic sum of $E_s$ and of the resultant $E_{R2}$ of E. M. F.'s $E_{101}$ and $E_{103}$.

The net result of the deviation on this circuit, then, is to impress between grid 69 and its filament 81, an alternating E. M. F. of smaller amplitude than when there is no deviation of support 15. It is thus seen that the same deviation increases the alternating potential of grid 68, while it decreases that of grid 69. In case the deviation be in an opposite direction, it can readily be shown that $E_1$ would be smaller than $E_s$, while $E_2$ would be greater than $E_s$, so that in that case, the grid circuit of amplifier 62 would be subjected to a diminished alternating E. M. F. while the grid circuit of tube 63 will be subjected to an increased alternating E. M. F.

Due to these selective variations, corresponding to the direction of deviation the amplifier system to be hereinafter described acts selectively upon certain translating devices, whereby they serve to rotate support 15 back to its desired position.

It is of course necessary to use a very large number of turns of wire on coils 100, 101, 102 and 103, and to rotate them at a high rate of speed, whereby in spite of the low value of the magnetic field intensity, substantial effects for controlling the compass may be produced. These considerations apply since the armatures are wound on nonmagnetic cores. It is to be further understood that all of the parts adjacent the coils should also be made of nonmagnetic material, to reduce distortion of the field. Nevertheless, to increase the effect of the earth's field, it may sometimes be desirable to utilize such a material as permalloy for the cores. This alloy consisting of 78.6% nickel and the remainder of iron, has a remarkably high permeability, even for the weak fields utilized in this type of apparatus.

Figure 2:
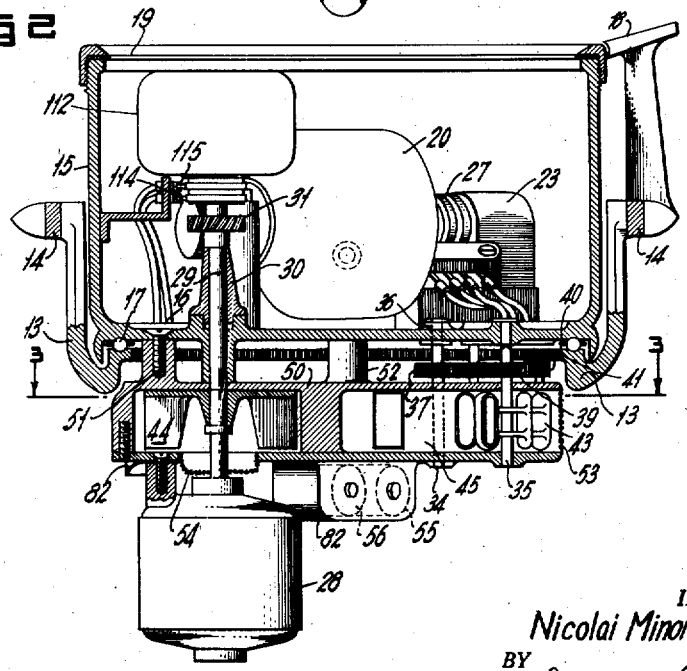
Fig. 2 is a view, mainly in section along a meridian plane of Fig. 1.

One manner in which the support 15 may be rotated relatively to the ring 13 is illustrated most clearly in Figs. 1, 2 and 3. The motor 28, which serves as the source of motion for both armature drums 20 and 21, is arranged with a vertical shaft 29 extending through the bottom 16 of support 15, and through the bearing standard 30 provided therefor. This shaft carries an appropriate motion transmitting device, such as the spiral gear 31, which meshes with the gears 32 and 33 mechanically connected to the two armatures 20 and 21, as described heretofore. The motor 28 is purposely located at a substantial distance below the armature drums 20 and 21 so as not to affect them magnetically. This motor also serves to rotate the support 15 on the bearings 17, in either direction as determined by the deviation of the support from the desired position. This function may be performed in a large variety of ways. In the present instance I show two vertical shafts 34 and 35 journaled in the support 15, and alternatively adapted to impart motion to a third shaft 36 in one or the other direction, depending upon which of the two shafts 34 and 35 is producing a torque. To effect this result, a large gear 37 is carried by shaft 36, with which mesh pinions 38 and 39 carried respectively by shafts 34 and 35. The gear 37 is in mesh with another pinion 40, which coacts with the internal gear teeth 41 cut in the ring 13. Since shafts 34 and 35 when active are caused to move in opposite directions in a manner to be hereinafter described, it is evident that the entire casing or support 15 with its associated parts including the motor 28 is caused to rotate on the bearings 17.

As an illustration of the drive for the two shafts 34 and 35, I show small Pelton wheels 42 and 43 connected respectively to these shafts, and arranged to be influenced as occasion requires by a blast of air produced by a small air turbine wheel 44 driven by the motor 28. In order to guide the blast either toward one or the other of the wheels 42 or 43, in response to the controlling forces, a movable trough or nozzle 45 is provided. In the position shown in Fig. 3, the nozzle 45 is in neutral position, the blast passing between the wheels 42 and 43 and causing no rotation thereof. A stationary extension 46 for the nozzle ensures that in this position the air will be guided past the blades of wheels 42 and 43 without influencing them. This neutral position corresponds to a condition where the position of compass card 19 coincides with that of the earth's field, and no movement thereof is necessary.

However, whenever there is a deviation of the support 15, forces are brought into play to rotate the guide or nozzle 45 about its axis 47 in one or the other direction and thereby to render one or the other wheels 42 and 43 active. Thus if guide 45 is rotated in a counterclockwise direction, its free end will register with the passageway 48 leading to wheel 43, and shaft 35 will be rotated in a counter-clockwise direction. An opposite rotation of guide 45 will cause the blast to be directed through passageway 49 leading to wheel 42, and shaft 34 will be rotated in a clockwise direction.

In order to encase the air motor parts, I provide a non-magnetic casing 50 supported as by bolts 51 and bosses 52 from the bottom 16 of the support 15. This casing may be made up of halves to facilitate assembly. Screening 53 and 54 may if desired be provided for the air turbine outlet and the air intake, respectively.

The mechanism for moving the guide 45 includes a pair of mechanically opposed solenoids 55 and 56 supported on the bottom of casing 50. The solenoid 55 has a core 57 that is arranged to pull guide 45 upwardly to register with opening 48, and for this purpose it is provided with slotted extension 58 arranged to coact with a pin 59 fastened to the bottom of guide 45 and passing through a slot 60 in the bottom of casing 50. A similar arrangement is provided for the other core 61, except that in this case it serves to push guide 45 toward opening 49. The mechanical and electrical arrangements are accurately proportioned so that in spite of the longer lever arm on which solenoid 55 operates, the effects of both solenoids on guide 45 will be exactly balanced when the compass card 19 is in correct position, and the guide 45 will be maintained in the neutral position of Fig. 3. The magnetic shield 82 is placed over the motor 28 and magnets 55 and 56, in order to minimize their effects on coils 20 and 21.

The complete operation of the device can now be set forth, and for this purpose reference will be made to Figs. 4, 5A, 5B, 6A, and 6B. Fig. 4 shows a plurality of vacuum tubes 62, 63, 64, 65, 66 and 67 of the well known thermionic form, having heated filaments 80, 81, 82, 83, 84 and 85, grids 68, 69, 70, 71, 72, and 73, and plates 74, 75, 76, 77, 78 and 79. Of course the amplifier arrangement now to be described in connection with the operation of the system may be varied considerably from the form shown, and more or less amplifier stages may be used. Any suitable equivalent scheme can obviously be used.

In this illustration of my method, a push-pull multistage amplifier system is shown, in which there are two stages, comprising respectively tubes 62, 63, and tubes 64, 65. The other two tubes 66 and 67 are power tubes operating as rectifiers. Inductance condenser coupling is shown between stages, but it is obvious that transformer or resistor coupling could as well be used.

As previously stated for symmetrical conditions on the control instrument, that is, when the axis of this instrument coincides with the direction of the magnetic meridian, the voltages impressed on the grids 68 and 69 of the vacuum tubes 62 and 63 of the first stage, are equal and in phase; in fact these voltages are nothing else but the voltage induced within the armature 112 since the voltages induced within the coils 100 and 102 on one hand and 101 and 103 on the other hand cancel each other. To these equal voltages impressed on the grids 68 and 69 of the vacuum tubes 62, 63 correspond variations of much larger magnitude of the plate currents occurring simultaneously with each other. The plate circuit for tube 62 can be traced as follows: from plate 74, inductance 86, battery 79, to filament 80. The plate circuit of tube 63 includes plate 75, inductance 87, battery 79, and filament 81.

These circuits provide paths for the normal direct current flow due to the stream of electrons emanating from the filaments; the alternating current component is forced to pass through a shunt path due to the inclusion of the large inductances 86 and 87. The shunt path for tube 62 includes condenser 90 and resistance 94; and for tube 63, condenser 91 and resistance 95.

Upon the grid circuits of tubes 64 and 65, are impressed E. M. F.'s which correspond to the variations in the output circuits of tubes 62 and 63. For example, the grid circuit of tube 64 includes the large resistor 94, across the terminals of which connect the grid 70 and filament 82. Thus this input circuit is subjected to an amplified E. M. F., causing corresponding large variations in E. M. F. in a branch path of the output circuit of tube 64. One path includes plate 76, inductance 88 and battery 79; and the branch in which the alternating current can pass includes condenser 92, high resistance 96, and a battery 98, the purpose of which will be described later.

The input of tube 65 is correspondingly connected to resistor 95, and its output circuit is similarly arranged, and includes a branch having an inductance 89, and an alternating current branch 93, 97, 99. Due to the flow of alternating current in the branches 92, 96, 98, and 93, 97, 99, there exist E. M. F.'s respectively between point 120 and the negative (upper) terminal of battery 98, as well as between point 121 and the negative (upper) terminal of battery 99. Upon the grid circuit of the power tube 66 there is impressed an E. M. F. which is the algebraic sum of the alternating E. M. F. across resistor 96, as well as the negative potential due to battery 98. This potential is so chosen that when the alternating E. M. F. reduces to zero, the plate current of tube 66 also reduces to zero. This condition is indicated at point M on Figs. 6A and 6B, which show the characteristics of both tubes 66 and 67. Similarly, the grid circuit of tube 67 has impressed upon it the alternating E. M. F. across resistor 97, and the potential of grid bias battery 99, whereby this tube also has zero plate current whenever the alternating E. M. F. reduces to zero.

The characteristic of both tubes is the same; as shown in Figs. 6A and 6B, the plate current $I_p$ is represented by the ordinates, while the grid potentials impressed upon the control grids is represented by the abscissæ. The curves $E_s$, $E_1$ and $E_{R1}$ of Fig. 6A are the equivalents of the wave curves similarly referenced in Fig. 5A; and these serve to determine the size of the instantaneous plate current at any stage of the cycle. For any negative values, the plate current reduces to zero; while for positive values, the plate current assumes the form shown by curve 2, which is plotted however with time as abscissæ. The plate current for tube 66 goes through solenoid 56 which serves as one of the actuators of the nozzle 45 (Fig. 3). A condenser 122 bridges the coil 56, and due to it, the current fluctuations are smoothed out to a great extent, so that the current through the solenoid 56 approaches more nearly a steady value. Thus for example, when grid 68 is subjected to the normal E. M. F. $E_s$ corresponding to zero deviation of support 15, the rectified current through the plate circuit of tube 66 could be plotted as curve 2; but due to the inclusion of condenser 122, the current through coil 56 takes the form shown by curve 3. In fact, additional filter arrangements could be used to reduce even the small fluctuations of the current 3, so as to make it conform closely to a uniform current.

In Fig. 6B there are illustrated similar curves to show how variations in the grid circuit of tube 63, affect the current flowing through the other actuating solenoid 55. This solenoid is bridged by a condenser 123, and is in the plate circuit of tube 67. For normal variations $E_s$ of the grid E. M. F., the current through coil 55 is represented by curve 3, which is equivalent to the current flowing in coil 56. Therefore, while there is no deviation of support 15, both actuating solenoids 55 and 66 have equal effects on nozzle 45, and it stays in the neutral position of Fig. 3.

Assume now that from this symmetrical condition the controlling instrument has slightly deviated so that the magnetic meridian "H" forms a small angle with the axis of symmetry of the coils taking the position H' of Fig. 4. The equilibrium of E. M. F.'s within the circuits 100 and 102 on one hand, and 101 and 103 on the other hand will then be disturbed. There will be a certain increase for example of the amplitude of the E. M. F. impressed on the grid 68 of the tube 62 and correspondingly a decrease of the amplitude of the E. M. F. impressed on the grid 69 of the tube 63. The plate current variations in the tube 62 will be thus increased and in the tube 63 decreased, which causes changes in the amplified E. M. F. proportional to the variation of the amplitudes of the input voltages. Finally as a result of this variation the plate current variations of the rectifier tube 66 are greater than before and are represented by the curve 2' of in Fig. 6A and the plate current variation of the tube 67 are smaller than before and will be presented by the curve 2'' on Fig. 6B. In view of the fact that the condensers or any other suitable filter system absorb most of the fluctuations in the currents flowing within the solenoids 55, 56, the current in solenoid 56 is substantially a unidirectional current having greater value than the unidirectional current in the circuit of the other solenoid 55. This causes predominance of the magnetic pull of the solenoid 56 as compared to that of 55 which acts on the air jets as already described. In case the deviation occurs in opposite direction the phenomenon would be reversed, that is, the amplitude of the grid potential variation of the tube 66 will be smaller and that of the tube 67 will be greater, and would correspond to an effect of the opposite sign; that is the magnetic pull of the solenoid 56 will be smaller and that of the solenoid 55 will be greater.

I may utilize the same method of control described in the above discussion to control the angular motion of the ship, aeroplane, or any other body to be steered. In that case the rectified direct current, instead of flowing in the solenoids operating the air jets, will be sent through two oppositely wound field coils of a direct current generator whose variable voltage may control the speed and direction of rotation of a pilot motor actuating the rudder either directly or indirectly or may act differentially on the speed control of two electric motors coupled through a differential gear whose planetary system is connected to the helm controlling member.

It is to be noted that the restoring control is effected without there being any current flow in the coils 100, 101, 102, and 103, since only the potential variations of grids are necessary, and there is no closed circuit through which the generated E. M. F.'s may drive a current. This is of great importance, because there is no armature reaction present, and there is thus an additional safeguard that the compass indication will be maintained accurate. Momentary deviations such as represented in Fig. 4 are of a small order of magnitude due to the immediate response of the restoring apparatus to such a deviation.

It is also seen from the foregoing that the vertical component of the earth's field always has the same effect on all of the tubes, and therefore due to the opposition of solenoids 55 and 56, this effect is entirely annulled as regards the restoring mechanism.

In the modification just described, a reference wave is established by the aid of coil 112; and deviations in amplitude of the controlling E. M. F.'s is secured by causing variations in amplitude in the E. M. F.'s superposed on the reference wave, and in phase therewith. The same kind of controlling effect can be secured by providing a system in which the deviations of the compass cause variations in the phase relations between them and the reference wave, whereby the resultants have magnitudes varying in accordance with the deviations of the compass.

Such a modification is shown in Fig. 7, in which there is a rotating armature 130, whose axis of rotation 131—131 is vertical and having four slip rings 132, 133, 134, and 135. The armature 30 is rotated by means of a small electric motor, 136, by the aid of the shaft 137. The armature 130 is suspended as usual within gimbal rings such as described in connection with the first modification, so that the axis of the armature remains vertical at all times. The rotating armature 130 can be made of an insulating material such as bakelite, and may contain as a core therein, some material of high permeability, such as permalloy, for the purpose of increasing the number of linkages of the lines of terrestrial magnetism with the windings located on the armature now to be described. The coils 138 and 139 each shown diagrammatically as one single turn, are wound on the armature substantially as shown. The planes of these coils are inclined to each other at a certain angle. The two coils in reality contain a great number of turns of very fine wire, and the ends of these coils are brought out to the slip rings 132 and 133 for the coil 139, and to the slip rings 134 and 135 for the coil 138, respectively.

Mounted on the same shaft 137 at a certain reasonable distance from the armature 130 there is a small armature 140 containing iron for the purpose of increasing its permeability, and this armature has a single phase winding represented diagrammatically as one single turn, 141 whose ends are brought out to two slip rings 142 and 143, respectively. The armature 140 with its single phase winding is rotated within the magnetic field produced by a pair of stationary poles, 144 and 145, excited from a source of electric power, 146, such as a storage battery or dry cell. The adjusting rheostat, 147, permits regulation of the strength of the flux thus obtained. In order to obtain as nearly sinusoidal E. M. F. as possible, the winding of the coil 141 may be suitably distributed over the periphery of the armature 140 and also the field can be arranged so as to give a more or less uniform distribution of the magneto-motive force, accounting thus for a more or less uniform distribution of the flux density in the air gap. The E. M. F. thus generated within the coil 141 can be made practically a perfect sinusoidal E. M. F. As stated previously, the coil 141 with its magnetic system can be located at a reasonable distance from the main armature 130 in order to avoid any interference from the leakage fluxes generated by the magnets 144 and 145 with the flux distribution of the terrestrial magnetism in the vicinity of the coils 138 and 139. For the same reason, the armature 140 with its magnetic circuit, 144, 145, can be preferably placed within a protective screen not shown made of a soft iron which intercepts all the flux leakages which may emanate from the system. Thus that system has no substantial influence upon the distribution of terrestrial field in the vicinity of the coils 138 and 139. The alternating E. M. F. generated within the coil 141 will be designated in the following as the reference wave and will be denoted as $E_{12}$.

Assume a condition represented on Fig. 7; that is, the axes of the poles 144 and 145 parallel to the axis of the magnetic meridian N—S. The voltage instantaneously induced in the coil 141 for the direction of rotation shown is indicated by the arrows; that is, the brush 143 is positive and the brush 142 is negative. At this very instant the plane of the magnetic meridian bisects the angle $\theta$ between the coils 132 and 133 and the time phase of the voltages induced in those coils by the horizontal component of the terrestrial magnetism H differ by angles $$\frac{\theta}{2}$$

from the factor of the voltage induced in the coil 141, (which passes through its maximum for the instant represented). The instantaneous polarity corresponding to the instantaneous direction of E. M. F. induced in the coils 138 and 139 is indicated for that particular moment by the arrows and by the signs + and — on the slip rings 132, 133, 134, and 135.

In order to utilize the system thus described for the purpose of bilateral control around the position of the magnetic meridian, I interconnect the circuits of the coils 138 and 139 and 141 as shown, namely the slip ring 142 corresponding to the negative potential of coil 141 at the instant under consideration is connected to both slip rings 132 and 135 of the coils 138 and 139, respectively, also corresponding to the negative terminal at the same instant. Due to these connections, it is seen that there is formed a circuit including coils 141 and 139 in which the electromotive forces of these coils are instantaneously in opposition to each other. This circuit can be traced as follows: slip ring 143, coil 141, slip ring 142, slip ring 132, coil 139, and slip ring 133. Similarly there is formed another circuit including coils 141 and 138, in which the electromotive forces of these coils are also instantaneously in opposition to each other. This circuit can be traced as follows: slip ring 143, coil 141, slip ring 142, slip ring 135, coil 138 and slip ring 134. Since the armatures 130 and 140 are rigidly connected and rotate within the fields of terrestrial magnetism and artificially created magnetism of two poles 144 and 145, respectively, this opposition of the induced voltages will prevail throughout the whole period of rotation as long as the axes of the poles 144 and 145 remain parallel to the plane of the terrestrial magnetism. The vector sums can be better described in connection with Figs. 8 and 9, in which $E_{12}$ represents the voltage developed in the coil 141; $E_9$ and $E_{10}$ represent the voltages induced in the coils 138 and 139. From the diagram it is obvious that the voltage induced in the coil 139 leads the voltage ($-E_{12}$) in time by an angle $$\frac{\theta}{2}$$

corresponding to the angle $$\frac{\theta}{2}$$

formed by the planes of the two coils 138, 141 at the given instant; and the voltage $E_{10}$ instantaneously developed in the coil 138 lags by an angle $$\frac{\theta}{2}$$

the vector ($-E_{12}$) corresponding to the opposed E. M. F. of coil 141 in the two control circuits. It follows therefrom that the potential differences $E_{s1}$, $E_{s2}$ which will appear between the slip ring 143 and the slip rings 133 and 134, respectively, will be represented both in magnitude and in direction in the vector diagrams above mentioned by diagonals $E_{s2}$, $E_{s1}$ of the parallelograms built on the voltage $E_{12}$ and voltages $E_9$ and $E_{10}$, respectively. The brush bearing on the slip ring 143 is connected to the negative end of the filament 80 of the first stage of the push-pull system entirely similar to the system previously described. The brushes bearing on the slip rings 133 and 134 are connected respectively to the grids 69 and 68 of the tubes 62 and 63. The amplifier system is not detailed, since its construction may be similar to that shown in Fig. 4.

For the symmetrical condition above considered, that is, when the axis of the poles 144 and 145 are strictly parallel to the plane of the magnetic meridian the amplitudes of the grid potential variations of the vacuum tubes 62 and 63 are equal and therefore the amplitudes of plate current variations in the same tubes are also equal but of opposite phase relations. The last circumstance, phase relation, however is of no importance since the final output will be rectified, as heretofore described and will thus depend rather on the amplitudes and not at all on the absolute phase relations. Now, let us assume that the ship or any other platform on which the above described apparatus is mounted has departed from its original direction in space over an angle $\beta$ in the direction shown on the drawings; that is, in the direction opposite to that in which the armature rotates. Everything will happen as if, all other conditions being equal, the magnetic meridian has shifted by the same angle in the opposite direction, that is, in the direction of the armature rotation. It is apparent that the time phase of the E. M. F.'s induced in the coils 138 and 139, respectively, are both lagging behind their former phase relation with respect to the vector $E_{12}$, as shown on Figs. 8, 9 in dotted lines. To this new condition correspond new values for the resultant potential difference $E'_{s1}$, $E'_{s2}$ (Fig. 9) acting on the grids 68 and 69 of the first stage. Thus the resultant voltage $E'_{s1}$ acting within the circuit coil 141, coil 139 and grid 69 is less in amplitude than the corresponding resultant voltage between the filament and the grid of the vacuum tube 62 comprising in series coil 141 and coil 138. If the amplitudes of all three E. M. F.'s $E_9$, $E_{10}$, and $E_{12}$ are substantially equal the change in the amplitude of the resultant voltages $E_{s1}$ and $E_{s2}$ acting on the grid circuits of vacuum tubes 62 and 63 will be substantially proportional to the deviation of the ship from her previous course, as this follows directly from the geometrical considerations relative to the vector diagram of Figs. 8 and 9. Thus the original equality of the amplitudes of the alternating potential difference impressed between the filament and the grids of the vacuum tubes ceases to exist as soon as the apparatus together with the ship departs from its symmetrical position previously described; that is, one potential difference acquires greater amplitudes, and the other smaller amplitudes than heretofore. To this will correspond changes in amplitudes in the plate current variations. It is apparent that the potential variations across resistors 94 and 95 undergo the same changes in their amplitudes as those which occur with the grid potentials previously mentioned, but these potential variations are considerably greater than of the original grid potentials impressed from coils 141, 138, 139, respectively, due to the amplification of the first stage of amplification. The rest of the circuit is an exact reproduction of the circuit previously studied with reference to the arrangement shown on Fig. 4. It can in general be stated that the performance of the scheme shown on Fig. 7 will be exactly the same as that of the instrument shown on Fig. 4, that is, for one direction of deviation the difference in the output currents as rectified will change in opposite directions so that the difference will be substantially proportional to the original angle of deviation of the instrument from magnetic meridian. In case the deviation changes in direction, the difference of currents on the rectified side will also change its sign, giving thus bilateral control to the group of electric translating devices, either motors or generators, described in connection with the system of Fig. 4. The behavior of the two instruments; namely that shown on Fig. 7, and the other shown diagrammatically on Fig. 4, are thus exactly identical, since the bilateral controlling effect is obtained from an earth inductor instrument having essentially alternating current features, which permits the accomplishment of two very important results: (*a*) the commutator is eliminated and slip rings are substituted therefor, (*b*) instead of an unstable direct current amplification requiring considerable bias batteries, a standard alternating current amplifier set can be used.

It is also obvious that the method of an artificial shift on the magnetic meridian by means of two coils at right angle to the plane of the magnetic meridian as described in my Patent No. 1,703,280, issued February 26, 1929, can be also used in this case for the same purpose. It would be sufficient to pass the rectified current of tubes 66 and 67, shown on Fig. 4, through two oppositely wound coils located at the right angle with respect to the axes of the magnets 144 and 145, so as to place the armature 130 within the action of E. M. F.'s generated by those coils. It is apparent also that the conditions of stability in these coils will remain strictly the same as specified in my above mentioned co-pending patent. The remaining conclusions relative to the brush shifting device in case of the direct current compass are applicable here provided the shifting of the axes of the electromagnets 144 and 145 with respect to the plane of magnetic meridian is considered instead of shifting of the line of the brushes.

I have described two distinct modifications of this broad invention, which, generally speaking, is based on the utilization, as by integration, of the amplitude variations of a certain alternating wave as a function of the displacement of the apparatus from a certain direction fixed in space. I wish to be understood, however, that any other modifications of this broad principle can easily be made without departing from the spirit and scope of the appended claims. It is obvious, for example, that instead of placing two coils, 138 and 139, on the armature 130 under a certain angle and having one single coil 141 on the armature 140 electrically in series with each of the coils 138 and 139 as shown, the arrangement can be easily reversed, as shown in Fig. 10. One single coil 148 can be provided on the armature 130, and two small coils 12′, 12″ under an angle to each other and symmetrically located with respect to the plane of the coil 148 can be used instead of coil 141, in series with the coil 148. This arrangement has exactly the same electrical performance as described in connection with the diagrams of Figs. 8 and 9.

What is claimed is:

1. In an induction compass, a pair of electrically connected armatures arranged to be influenced by the earth's magnetic field, the axes of said armatures being non-parallel, and means for maintaining these axes horizontal.

2. In an induction compass, a pair of rotatable armatures having non-parallel horizontal axes, and arranged to be influenced by the earth's magnetic field, and means for connecting the armatures electrically in opposition to annul the effect of the vertical component of the earth's field.

3. In an induction compass, a pair of armatures rotatable about non-parallel horizontal axes, and arranged to be influenced by the earth's magnetic field, the axes being relatively fixed, and means brought into operation by a deviation of the non-parallel axes from symmetrical positions with respect to the magnetic meridian, for restoring the armatures to the symmetrical positions.

4. In an induction compass, a pair of armatures rotatable about non-parallel horizontal axes, and arranged to be influenced by the earth's magnetic field, the axes being relatively fixed, a support for the armatures rotatable about a vertical axis, and means brought into operation by deviation of the armature axes from symmetrical positions with respect to the magnetic meridian, for rotating the support to restore the symmetrical arrangement.

5. In an induction compass, an armature rotatable about a horizontal axis and arranged to be influenced by the earth's magnetic field, and means responsive to a departure of the axis from a definite direction for returning it to that direction.

6. In an induction compass, a rotatable armature having a horizontal axis and arranged to be influenced by the earth's magnetic field, a support for the armature rotatable about a vertical axis, and means responsive to a departure of the axis from a definite direction for rotating the support so as to restore the axis to that direction.

7. In an induction compass, a pair of rotatable armatures arranged to be influenced by the earth's magnetic field, said armatures having non-parallel horizontal axes, and an electronic amplifier system responsive to the E. M. F.'s generated by said armatures.

8. In an induction compass, a rotatable armature having a horizontal axis, and generating an alternating current E. M. F. the value of which depends upon the relative directions of the armature axis and of the magnetic meridian, and means influenced by this E. M. F. for maintaining the armature axis in a constant direction.

9. In an induction compass, a pair of rotatable armatures having non-parallel horizontal axes and generating alternating E. M. F.'s the values of which depend upon the relative directions of the armature axes and of the magnetic meridian, and means influenced by these E. M. F.'s for maintaining the armature axes in constant directions.

10. In an induction compass, a rotatable armature having a horizontal axis, and generating an alternating current E. M. F. the value of which depends upon the relative directions of the axis and of the magnetic meridian, a support for the armature, rotatable about a vertical axis, and means influenced by the E. M. F. for rotating the support to maintain the axis in a constant direction.

11. In an induction compass, a pair of rotatable armatures having non-parallel horizontal axes and generating alternating E. M. F.'s the values of which depend upon the relative directions of the axes and of the magnetic meridian, a support for the armatures, rotatable about a vertical axis, and means influenced by the E. M. F.'s for rotating the support to maintain the axes in constant directions.

12. In an induction compass, an inductor element for generating a controlling E. M. F. the value of which is dependent upon the relative positions of the element and the magnetic meridian, a support rotatable about a vertical axis, for the element, operating means for rotating the element, and means for rotating the support by the aid of the said operating means and in response to a variation in the E. M. F. due to a deviation of the axis of the element from a constant direction.

13. In an induction compass, an inductor element for generating a controlling E. M. F. the value of which is dependent upon the relative positions of the element and the magnetic meridian, a support rotatable about a vertical axis for the element, operating means for rotating the element, and means for rotating the support by the aid of the said operating means, comprising a pair of air turbine wheels of opposite tendency, means driven by said operating means for generating an air blast, and a guide movable to direct the blast selectively to either turbine wheel.

14. In an induction compass, a pair of inductor elements having non-parallel horizontal axes, for generating alternating E. M. F.'s the values of which are dependent upon the relative positions of the axes with respect to the magnetic meridian, a support rotatable about a vertical axis, for these elements, a motor for rotating the elements and carried by the support, means operated by the motor to generate an air blast, a pair of wheels arranged to be rotated in opposite directions by the blast and connected to rotate the support in opposite directions, a movable guide for the blast to direct the blast selectively to either wheel or to neither, an amplifier system for amplifying the generated E. M. F.'s and electrically operated means for moving the guide and controlled by the amplifier system in such manner that its mechanical effect on the guide is nullified only when the two generated E. M. F.'s have a constant relation to each other, corresponding to constant directions of the axes of the inductor elements.

15. In an induction compass, means for generating, by the aid of the terrestrial field, a pair of alternating electromotive forces, means for so mounting said generating means on the compass that the electromotive force increases and the other decreases upon deviation in one direction, and vice versa, means for rectifying the electromotive forces, and means for affecting the compass to reduce its deviation, operated in accordance with the variations in magnitude of said electromotive forces.

16. In an induction compass, means for generating, by the aid of the terrestrial field, a pair of electromotive forces, means for so mounting the generating means upon the compass that the sense of variation of each electromotive force reverses upon a reversal of the compass deviation, means for providing a reference electromotive force with which each of said pair of electromotive forces may be combined, means for combining said reference electromotive force with each of said generated electromotive forces and means for affecting the compass to reduce its deviation, operated in accordance with the variations in magnitude of the combined sets of electromotive forces.

17. In an induction compass, means for generating, by the aid of the terrestrial field, a pair of alternating electromotive forces, means for so mounting the generating means on the compass that the sense of variation of each electromotive force reverses upon a reversal of a deviation, means for providing a reference alternating electromotive force upon which each of said pair of electromotive forces may be superposed, means for combining said reference electromotive force with each of said generated electromotive forces, means for rectifying the pair of combined electromotive forces, and means for affecting the compass to reduce its deviation, operated in accordance with the variations in magnitude of the combined electromotive forces.

18. In an induction compass, means for generating a reference alternating electromotive force, means for generating a pair of alternating electromotive forces, one of said means being excited by the terrestrial field, means for separately and respectively combining each of said pair of electromotive forces with the reference electromotive force to form a pair of controlling electromotive forces, the combining being such that deviation of the compass affects at least some of the electromotive forces whereby there results a variation in the magnitude of the controlling electromotive forces in opposite directions upon opposite deviations, and means affected by the variations in said controlling electromotive forces, to reduce the deviation.

19. In an induction compass, means for generating a reference alternating electromotive force, means for generating a pair of alternating electromotive forces, one of said means being excited by the terrestrial field, means for separately and respectively combining each of said pair of electromotive forces with the reference electromotive force to form a pair of controlling electromotive forces, the combining being such that deviation of the compass affects the phase relations between the component electromotive forces, whereby upon opposite deviation of the compass, the controlling electromotive forces vary in magnitude in opposite directions, and means affected by the variations in said controlling electromotive forces to reduce the deviation.

20. In an induction compass, a coil arranged to generate a reference alternating electromotive force, means for rotating said coil, a pair of coils arranged to be rotated in synchronism with said first coil and arranged to generate a pair of alternating electromotive forces that are displaced in phase relative to each other, one of said coil arrangements being excited by the terrestrial field, whereby upon deviation of the compass, a variation in the phase between the reference electromotive force and each of the other pair of electromotive forces results, and means whereby such variation in phase affects the compass to reduce its deviation.

21. In an induction compass, a coil arranged to generate a reference alternating electromotive force, means for exciting said coil, means for rotating said coil, a pair of coils mounted for synchronous rotation with said first coil and excited by the terrestrial field so as to generate two alternating electromotive forces displaced from each other, said coils being so arranged with respect to the reference electromotive force that upon deviation of the compass, the phase relations between the reference electromotive force and each of the other coils varies, to produce, by combination, a pair of controlling electromotive forces which vary oppositely in magnitude upon deviation of the compass, and means whereby such variations affect the compass to reduce its deviation.

22. In an induction compass, means for generating, by the aid of the terrestrial field, a pair of controlling alternating electromotive forces, the amplitudes of which vary oppositely upon deviation of the compass, means for rectifying these electromotive forces, and means operated in accordance with the rectified electromotive forces for reducing the deviation.

23. In an induction compass, the method of reducing the deviation thereof upon movement of the compass from its magnetic meridian; which comprises generating a pair of controlling electromotive forces by the aid of the terrestrial field, increasing one of said electromotive forces and decreasing the other, upon deviation of the compass, and operating the compass to reduce the deviation in accordance with the difference in magnitude of the controlling electromotive forces.

24. In an induction compass, the method of securing controlling electromotive forces affecting the compass, which comprises generating a reference electromotive force; generating a pair of electromotive forces of the same frequency as the reference electromotive force by rotating a pair of coils so as to be affected by the terrestrial field, the phases of said pair of electromotive forces being displaced and combining each of said pair with the reference electromotive force to produce a pair of resultant controlling forces, the amplitudes of which are dependent upon the relative phase relations.

25. In an induction compass, a rotatable inductor coil arranged to be influenced by the earth's horizontal component, means for producing a force upon relative deviation of the coil's axis of rotation and the earth's horizontal component from a definite relation, and a movable indicating member operated upon by said force to keep said member in a fixed position with respect to the said component.

26. In an induction compass, an alternating current armature arranged to be influenced by the earth's magnetic field, and having a horizontal axis, means for producing a force upon relative deviation of said axis and the earth's horizontal component from a definite relation, and a movable indicating member operated upon by said force to keep said member in a fixed position with respect to the said component.

27. In an induction compass, a rotatable inductor coil arranged to be influenced by the earth's horizontal component, means for producing a force upon relative deviation of the coil's axis of rotation and the earth's horizontal component from a definite relation, and means whereby said force is utilized to return the coil axis to said definite relation.

28. In an induction compass, a pair of armatures arranged to be rotated in the earth's magnetic field for generating two separate E. M. F.'s, the axes of said armatures having a predetermined fixed relation to each other, means connecting said armatures together to produce a differential E. M. F. from the two generated E. M. F.'s, and means responsive to said differential E. M. F. for maintaining said axes in a fixed position with respect to the magnetic meridian.

29. In an induction compass, a pair of armatures rotatable about relatively fixed axes having a predetermined relation to each other, and arranged to be influenced by the earth's magnetic field, and means responsive to and brought into operation by a differential E. M. F. produced by said armatures upon deviation of their axes from symmetrical positions with respect to the magnetic meridian for restoring the armatures to the symmetrical positions.

30. In an induction compass, a pair of armatures rotatable about relatively fixed axes having a predetermined relation to each other, and arranged to be influenced by the earth's magnetic field, a support for the armatures rotatable about a vertical axis, and means responsive to and brought into operation by a differential E. M. F. produced by said armatures upon deviation of the armature axes from symmetrical positions with respect to the magnetic meridian for rotating the support to restore the symmetrical arrangement.

31. In an induction compass, a support, a pair of armatures arranged to be rotated in opposite directions on said support and influenced by the earth's magnetic field for generating alternating E. M. F.'s the values of which depend upon the relative positions of the support and the magnetic meridian, means for combining said E. M. F.'s to produce a differential E. M. F. and indicating means responsive to said differential E. M. F. for indicating a change in the relative positions of said support and the magnetic meridian.

32. In an induction compass, a support, a pair of armatures arranged to be rotated in opposite directions on said support and influenced by the earth's magnetic field to simultaneously generate two alternating E. M. F.'s which are equal in amplitude but opposite in phase when the support is in a certain position with respect to the magnetic meridian and which vary differentially upon a deviaton of the support from said position, means for combining said E. M. F.'s to produce a differential E. M. F. and electro-responsive means operated by said differential E. M. F. for indicating the direction of such deviation.

33. In an induction compass, a support, a pair of rotatable coils carried by said support and arranged to be influenced by the earth's magnetic field, means for rotating said coils in opposite directions whereby two E. M. F.'s are generated, the values of which depend upon the relative positions of the support and the magnetic meridian, means for combining said E. M. F.'s, and means responsive to the resultant E. M. F. for indicating a change in the relative positions of said support and the magnetic meridian.

NICOLAI MINORSKY.